UNITED STATES PATENT OFFICE.

EDUARD POHL, OF KALK, GERMANY, ASSIGNOR, BY DIRECT AND MESNE ASSIGNMENTS, TO ADOLPH SCHENK, OF BERGEDORF, GERMANY.

PROCESS OF MANUFACTURING CARBONS FOR ELECTRICAL PURPOSES.

SPECIFICATION forming part of Letters Patent No. 662,090, dated November 20, 1900.

Application filed August 29, 1899. Serial No. 728,872. (No specimens.)

*To all whom it may concern:*

Be it known that I, EDUARD POHL, a subject of the King of Prussia, and a resident of Kalk, near Cologne-on-the-Rhine, Prussia, German Empire, have invented certain new and useful Improvements in Processes of Manufacturing Carbons for Electrical and Electrochemical Purposes; and I do hereby declare that the following is a full, clear, and exact description of the invention, which will enable others skilled in the art to which it appertains to make and use the same.

The present invention relates to the manufacture of carbon bodies for electrical and electrochemical purposes, such as pencils for electric lamps, contacts for generators, motors, interrupters, and the like, microphonic contacts, electrodes for electrolytical cells, &c.; and its object is to improve that step in said manufacture which is commonly understood by the term "graphitizing."

It is well known that carbon bodies in order to be fit for use in electrical and electrochemical appliances must combine high density with great strength, and to obtain this the bodies are subjected to what is called "graphitizing," which term means treating the carbon bodies by the action of heat and filling up their pores by the deposition therein of carbon.

It has been found a long time ago that the carbon deposit forming on the inside of the retorts in which coal is subjected to the process of destructive distillation by virtue of its specific molecular condition answers very well the requirements as to density and strength. This peculiar condition of the so-called "gas-retort" carbon is due to the fact that the incandescent deposit once formed is constantly in contact with and penetrated by part of the hot gases generated within the retort, which part of gases by its intimate contact with the incandescent deposit is caused to dissociate, the carbon molecules thus set free being deposited in the pores and upon the surface of the deposit and "welded together" with the same, so to say. The result is a very dense and strong carbon, having somewhat of the nature of the graphitic modification. As gas-retort carbon requires a long time for forming, and, moreover, is obtainable in comparatively small pieces only, attempts have been made to imitate its forming process, so as to form it in a short time. One way is to make a carbon body, impregnate the same with hydrocarbons, embedding such impregnated body in coal-dust, and subjecting it to the action of heat with exclusion of the outer air. Another way is to heat the carbon body in an atmosphere containing hydrocarbons. The result of either of these processes has proved to be unsatisfactory, as is clearly evidenced by the fact that at present attempts are made to improve the strength and density by an admixture of metallic compounds to the carbon.

I have discovered that in order to obtain a perfect effect as to the filling up of the pores of the body and its conversion in the desired modification of carbon the carbon-yielding gas must not be generated within the body itself nor caused to act on a naked body, but that the body requires to be embedded in a mass of reduced coal, which is impregnated with an atmosphere of said gas. In other terms, the body has to be inclosed in an intimate mixture of carbon particles and carbon-yielding gas. When under these conditions a sufficiently high degree of heat is applied from the outside, a very copious transfer or immigration of carbon molecules is caused to take place from the inclosing mixture of solid carbon particles and carbon-yielding gas into the inclosed body, the molecules of the latter uniting with the immigrating molecules and the nature of the body being thoroughly modified—that is to say, the body has imparted to it such a degree of density, strength, and hardness as are in no wise obtainable by applying either of the known processes. Carbon bodies treated according to this improved method will answer with a clear metallic sound when struck by means of a hard object, their density amounts to a specific gravity of 1.7, their hardness is such as to withstand the action of the best qualities of emery, and their color shows to be by far brighter than that of the best carbons in the market. There is, however, a serious defect in that the surface of the inclosed body frequently becomes incrusted with irregular agglomerations of carbon, which, owing to their extreme mechanical resistance, it is very difficult to remove, so that the product, though admirably well adapted in all other respects, is unfit for use in such cases where a smooth or even surface is required. Obviously those agglomerations are due to circumstances, such as imperfect contact, which allow depositions of carbon molecules to take place between the inclosing mass and the inclosed body. My attempts to prevent those agglomerations from forming have resulted in the discovery of the very striking fact that by the interposition between the body and the inclosing mass of a thin screen composed of an organic substance adapted to be readily transformed into coke-like carbon when heat is applied the inclosed body is improved, as stated, without any agglomeration or incrustation being allowed to form on its surface. Such screening substances are textile fabrics, sawdust, peat, starch, and the like applied to the body as a thin layer. The best results have been obtained by closely wrapping the body in a thin sheet of paper. In any case the effect is striking. The inclosed carbon body is closely encompassed in a thin envelop of a coke-like nature, which adheres in no point to the inclosed body, but can easily be removed from the same, leaving it with a perfectly smooth or even surface, so that the body can be made use of without further treatment.

The impregnation of the inclosing carbon mass with carbon-yielding gas can be effected by forcing a current of such gas into the same or by impregnating the inclosing carbon mass with such substances as give off such gases when heat is applied. I prefer the first-cited mode, and, moreover, I prefer to heat the current of gas prior to forcing it into the inclosing carbon mass.

From what has been said it is easily to be understood that the present invention consists in its most perfect form in the combination, with a mixture of solid carbon particles and a carbon-yielding gas for inclosing the carbon body to be treated, of a readily-forming inadhesive screen of coke-like nature, but that in cases where evenness of surface is of no importance said screen may be omitted.

I wish it to be understood that in the claims annexed the term "carbon" is used as comprising any appropriate description of fossil or artificial carbon in its raw or in a prepared state, that the term "paper" is to include any carbonaceous substance capable of being readily reduced to a coke-like nature by the application of heat, and that the term "carbon-yielding gas" is intended to express any non-oxidizing gas capable of giving off carbon when in contact with incandescent carbon.

In carrying out my invention I prefer to proceed as follows: A carbon body, shaped as desired—for instance, a rod or a plate—is produced in the usual way—that is to say, by mixing powdered coke, charcoal, gas-retort carbon, or any other description of coal or carbon with an appropriate cementing agent—such as tar, oil, and the like—and molding, all as is well known to those skilled in the art. After drying and burning, the body is closely wrapped in a sheet of paper and the wrapped body placed centrally into a receptacle of iron or other fireproof material which can be air-tightly closed and is provided with a gas-inlet. The interval between the body and the walls of the receptacle is filled with reduced charcoal, coke, peat, or with lamp-black and the like, when the receptacle is closed and heated up to white heat as rapidly as possible and the current of hot gas admitted. The latter may consist of carbonic oxid, hydrocarbons, cyanogen or cyanogen compounds, and the like. I prefer to use a hot current of hydrocarbon gas. After having been exposed for a sufficient-long period to the action of heat the receptacle and its contents are allowed to cool, when the receptacle is opened, the body taken out from the inclosing mass, and the coke-like envelop removed.

Having fully described my invention, what I desire to claim and secure by Letters Patent is—

1. The process of manufacturing carbon bodies for electrical and electrochemical purposes which consists in forming a body of carbon, and inclosing the same in an intimate mixture of carbon particles and carbon-yielding gas under the action of heat, said gas being generated outside of the carbon body, substantially as described.

2. The process of manufacturing carbon bodies for electrical and electrochemical purposes which consists in forming a body of carbon, covering the same with a thin layer of a readily-cokable substance, embedding the covered body in a mass of reduced carbon, heating with the exclusion of the outer air, and creating a carbon-yielding atmosphere within the said inclosing mass, substantially as described.

3. The process of manufacturing carbon bodies for electrical and electrochemical purposes which consists in forming a body of carbon, wrapping the same in paper, embedding the wrapped body in a mass of reduced carbon, heating with the exclusion of the outer air, and creating a carbon-yielding atmosphere within the said inclosing mass, substantially as described.

4. The process of manufacturing carbon bodies for electrical and electrochemical purposes which consists in forming a body of carbon, wrapping the same in paper, embedding the wrapped body in a mass of reduced carbon, heating with the exclusion of the outer air, and forcing a current of carbon-yielding gas into said inclosing mass of carbon, substantially as described.

5. The process of manufacturing carbon bodies for electrical and electrochemical purposes which consists in forming a body of carbon, wrapping the same with paper, embedding the wrapped body in a mass of reduced carbon, heating with the exclusion of the outer air, and forcing a hot current of carbon-yielding gas into said inclosing mass of carbon, substantially as described.

In testimony whereof I have hereunto set my hand in presence of two subscribing witnesses.

EDUARD POHL.

Witnesses:
FRIEDRICH MAYER,
GOSOMUR SCHOLZ.